April 28, 1964   E. R. CARLSON   3,131,013
DUPLEX ADAPTER WITH AUTOMATIC GROUNDING MEANS
Filed July 6, 1959   2 Sheets-Sheet 1
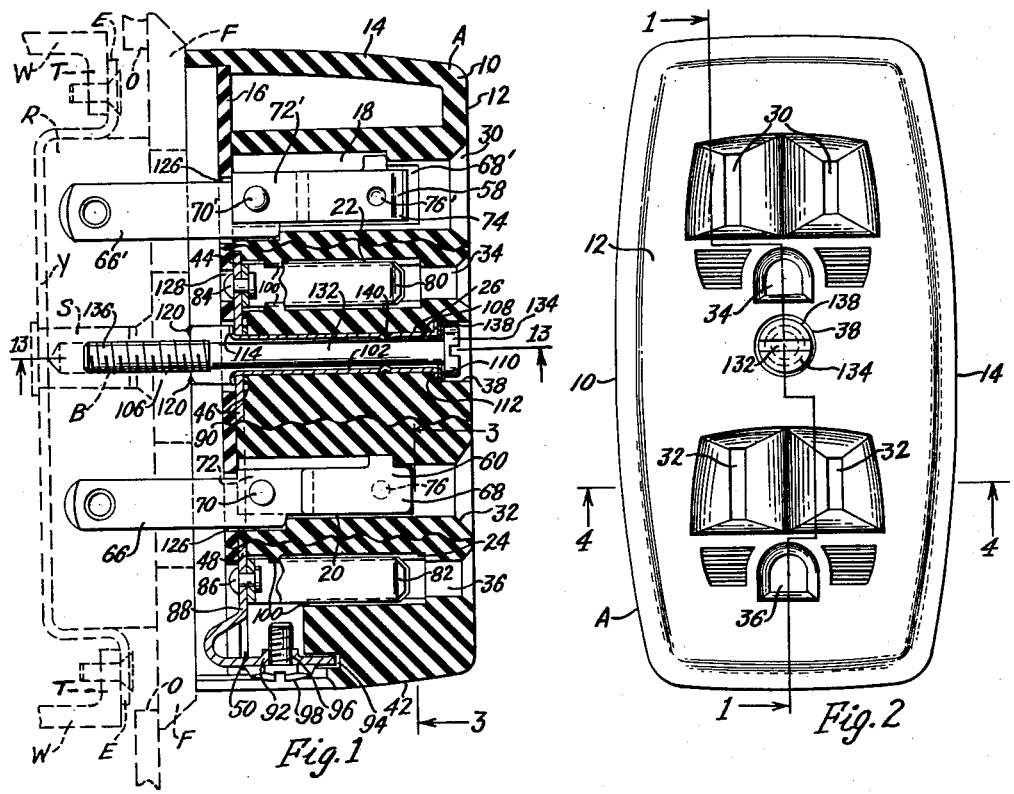
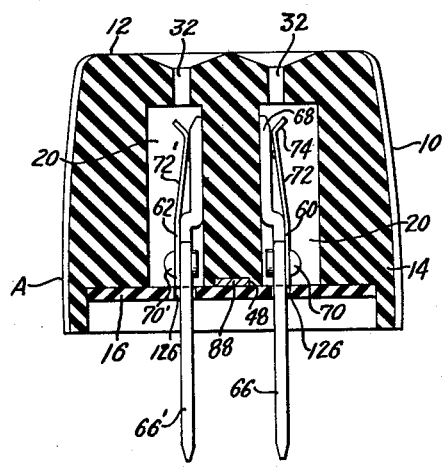
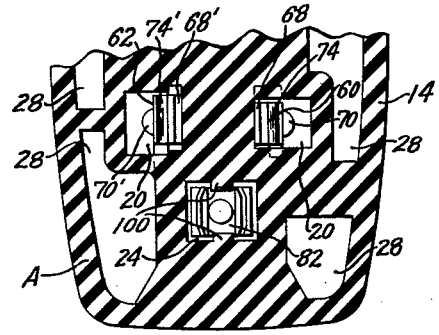
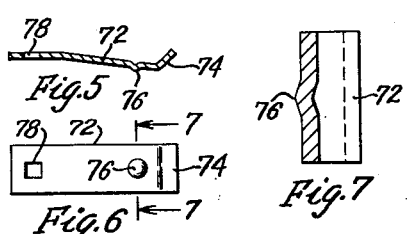
INVENTOR
Ernest R. Carlson
BY
Worster, Davis & Cifelli
ATTORNEYS

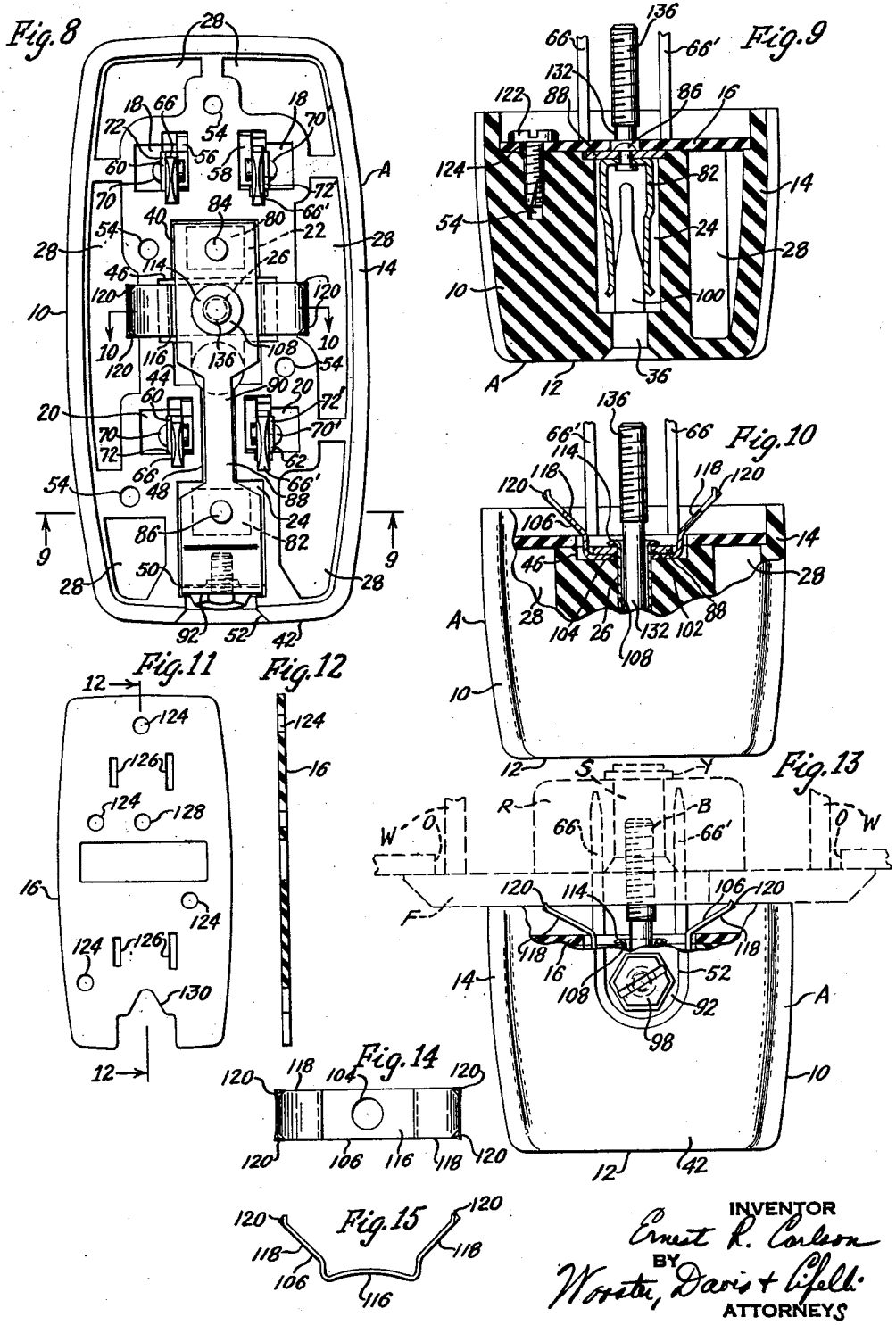

United States Patent Office 3,131,013
Patented Apr. 28, 1964

---

3,131,013
DUPLEX ADAPTER WITH AUTOMATIC GROUNDING MEANS
Ernest R. Carlson, Fairfield, Conn., assignor to Harvey Hubbell, Incorporated, Bridgeport, Conn., a corporation of Connecticut
Filed July 6, 1959, Ser. No. 824,999
6 Claims. (Cl. 339—14)

This invention relates to an improved adapter for an existing, electrical receptacle, such as a conventional convenience wall outlet having one or more sets of two openings for receiving conventional two-pronged attachment plugs, which herein are referred to as "ungrounding receptacles," for rendering the ungrounding receptacle usable with grounding electrical connections, such as three-pronged grounding attachment plugs.

The necessity for making grounded electrical connections is becoming more apparent all the time, and they have become mandatory in many contemporary electrical wiring installations. In most industrial applications of electrical connections and in many domestic applications, such as those involving the use of appliances, tools and other electrical equipment in a basement, garage or similar area, it has become extremely desirable from the point of view of safety to provide electrical receptacles which are capable of making grounded electrical connections. Grounding electrical connections usually include the utilization of a three-pronged attachment plug. Where new building construction is involved, it is a relatively simple matter to initially provide for making grounded electrical connections by initially installing electrical receptacles, such as those having one or more sets of three openings to receive three-pronged grounding attachment plugs, that are designed to make grounded electrical connections, which hereinafter will be referred to as "grounding electrical receptacles." In the case of existing buildings which include conventional ungrounding electrical receptacles, however, the cost of converting to grounding electrical receptacles in the absence of my invention would be extremely high, for it would require the replacement of the existing ungrounding receptacles by grounding electrical receptacles by a qualified electrician. In view of the high labor costs involved in addition to the cost of replacement parts, such conversion is an expensive matter.

It is an object of this invention to provide an improved adapter for an existing ungrounding electrical receptacle which renders the receptacle usable with grounding electrical connections, which can be installed by anyone, simply by connecting it to the existing receptacle, and which is designed so as to substantially eliminate any possibility of its being installed in an ungrounded condition.

It is another object of the invention to provide an improved adapter for an existing, ungrounding electrical receptacle which renders the receptacle capable of receiving grounding electrical connections, and which has grounding means which normally automatically become operative through the receptacle when the adapter is connected to the receptacle, and which alternatively is capable of being rendered operative by connection to an alternative source of ground when grounding cannot be established through the receptacle.

It is another object of the invention to provide an improved duplex adapter for an existing, ungrounding, duplex receptacle, having grounding means for rendering the receptacle usable with grounding electrical connections and possessing some or all of the advantages set forth in the preceding two paragraphs.

The above objects are accomplished in one form by the provision of an adapter having grounding means which normally cooperates with a grounded means of an existing, ungrounding electrical receptacle and which is arranged to be electrically connected to the grounding means of a grounding electrical connection that is connected to the adapter, but which is capable of being connected to an alternative source of ground when grounding cannot be accomplished through the existing receptacle, and which includes means for securing the adapter to the existing receptacle which is irremovably mounted in the adapter but is part of the grounding system.

The above and other objects and further details of that which I believe to be novel and my invention will be clear from the following description and claims taken with the accompanying drawings, wherein:

FIG. 1 is a sectional view of a duplex adapter which incorporates the invention taken substantially on line 1—1 of FIG. 2, and showing in dotted lines portions of a wall box, ungrounding electrical receptacle and face plate with which the adapter may be operatively associated;

FIG. 2 is a top plan view of the adapter;

FIG. 3 is a sectional view taken substantially on line 3—3 of FIG. 1;

FIG. 4 is a sectional view taken substantially on line 4—4 of FIG. 2;

FIG. 5 is a central sectional view of one part of the contact blade assemblies which are incorporated in the adapter;

FIG. 6 is a plan view thereof;

FIG. 7 is a sectional view taken substantially on line 7—7 of FIG. 6;

FIG. 8 is a bottom plan view of the adapter with the retaining plate removed for clarity;

FIG. 9 is a sectional view taken substantially on line 9—9 of FIG. 8, but showing the retaining plate;

FIG. 10 is a partial end elevational view of the adapter and a partial sectional view thereof taken substantially on line 10—10 of FIG. 8, but showing the retaining plate;

FIG. 11 is a plan view of the retaining plate;

FIG. 12 is a sectional view taken substantially on line 12—12 of FIG. 11;

FIG. 13 is a partial end elevational view of the adapter taken from the opposite end to that shown in FIG. 10, and a partial sectional view thereof taken substantially on line 13—13 of FIG. 1;

FIG. 14 is a plan view of the grounding plate spring, and

FIG. 15 is a side elevational view thereof.

In the drawings there is illustrated an embodiment of my invention which is in the form of a duplex adapter having grounding means which is particularly well suited for use with an existing, ungrounding, duplex electrical receptacle, and which when used in conjunction therewith normally automatically renders the receptacle usable with grounding electrical connections. The illustrated adapter is designed for use with a variety of grounding electrical connections, such as those having a three-wire, three-contact blade, grounding plug which includes a grounding contact blade, and those having a two-wire, two-contact blade plug having an associated, separate, grounding wire. The term "grounding electrical connection" as used throughout this patent application is intended to cover both of these types of connections. It should be clearly understood that the illustrated embodiment of the invention may be utilized with various kinds of existing, ungrounding, duplex electrical receptacles. Furthermore, it will be apparent to those skilled in the art, and it also should be clearly understood, that the fundamental inventive concept involved is not limited to use in duplex adapters, but may be used in various and other types of adapters, as, for example, single adapters. Therefore, the illustrated embodiment should be taken as being exemplary of one physical embodiment of the invention.

The illustrated embodiment of the invention comprises a duplex adapter in the form of a relatively small, portable, self-contained device which is designed to be manually removably connected to an existing, ungrounding, duplex electrical screw-type receptacle by relatively simple manipulation. The adapter is designated generally by reference character A and comprises a body 10 of electrical insulating material which may conveniently be molded or equivalently formed of any suitable, available plastic material. The body 10 is compartmented so as to appropriately house and/or support all of the other parts of the adapter. The body 10 generally comprises a top wall 12, a peripheral, skirt-like, side wall 14 and a plurality of interconnected, internal walls (unnumbered) which are connected to the top wall 12 and side wall 14, and are disposed so as to compartmentalize the interior of the body (see FIG. 8), to provide a plurality of appropriate compartments and recesses for housing some of the parts. A plurality of openings are formed in the internal walls for receiving securing means for attaching a retaining plate to the body after all of the other parts are positioned relative thereto and for receiving means for mounting the adapter on an existing receptacle. The retaining plate is made of a suitable electrical insulating material such as the board type, is designated by reference numeral 16 throughout the drawings, and can most clearly be seen by itself in FIGS. 11 and 12. However, for the purpose of facilitating an understanding of the construction of the remainder of the adapter, it is helpful to consider the body and associated parts with the retaining plate removed.

As can most clearly be seen in FIG. 8, the internal walls of the body 10 provide a pair of spaced compartments 18 near one end of the body, a pair of spaced compartments 20 near the other end thereof, a compartment 22 disposed adjacent to the compartments 18, and a compartment 24 disposed adjacent to the compartments 20. A central bore 26 extends completely through the body 10 from top to bottom. Various other compartments 28 are also formed by the internal walls, but they do not house any of the operating parts of the adapter which will subsequently be disclosed.

All of the compartments 18, 20, 22 and 24 extend completely through the body 10, as can best be seen in FIG. 1. The compartments 18 at their upper ends are reduced into narrow slots 30, one longer than the other. The compartments 20 at their upper ends are reduced into narrow slots 32, one longer than the other. The compartments 22 and 24 are reduced at their upper ends into non-circular openings 34 and 36, respectively. It will be apparent to those skilled in the art that each pair of slots 30 and 32 is designed to accommodate a separate, polarized electrical plug, a technique which is known in the electrical art. The bore 26 at its upper end communicates with an enlarged recess 38. As can best be seen in FIGS. 1 and 2, the portions of the top wall 12 adjacent to the slots 30, 32 and openings 34, 36 are beveled so as to facilitate insertion of the male contact blades of a cooperating electrical plug into the slots and openings.

The bottom surface of the internal walls of the body 10 has an irregularly-shaped, shallow recess 40 formed therein which extends longitudinally and centrally of the body from one end 42 of the side wall 14 approximately two-thirds the length of the body (see FIG. 8). The recess 40 comprises a longitudinally extending, generally rectangular portion 44, a laterally extending, generally rectangular portion 46 which intersects the portion 44 at a right angle, a longitudinally extending, narrow portion 48, and an enlarged portion 50 which is deeper than the remainder of the recess 40 and extends through side wall end 42. A portion 52 of the side wall end 42 is cut away and intersects recess portion 50. A plurality of bores 54 extend through the internal walls from the bottom thereof partially therethrough.

Individual contact blade assemblies are disposed and appropriately mounted in the individual compartments 18 and 20. A plain contact blade assembly 56 is disposed in the compartment 18 that has the narrower slot 30, and a polarized contact blade assembly 58 is disposed in the other compartment 18. A plain contact blade assembly 60 is disposed in the compartment 20 that has the narrower slot 32, and a polarized contact blade assembly 62 is disposed in the other compartment 20. The purpose of having a plain and an associated polarized contact blade assembly is to permit reception of a polarized electrical plug, as is well known in the electrical art.

All of the contact blade assemblies are generally constructed in the same manner, in that each comprises a unit of an elongated, irregularly-shaped, formed contact blade and an associated contact spring which is secured thereto. For purposes of illustration, reference may be had to FIGS. 3 and 4 wherein the construction of contact blade assemblies 60 and 62 may be clearly seen, and wherein it will be observed that these assemblies differ only in the dimensions of the contact blade, depending on whether it is plain or polarized, the latter being wider. In the case of contact blade assembly 60, it comprises an elongated, formed contact blade 66 having an offset, beveled upper end 68 to which is secured, as by the rivet 70, a contact spring 72, the upper end 74 of which is bent oppositely to the direction of bevel on the contact blade end 68. The spring end 74 and contact blade end 68 cooperate to form a female contact portion that is adapted to receive a male contact blade. The lower end of the contact blade 66 forms a male contact portion. Therefore, each contact blade assembly comprises a female contact portion and a male contact portion.

The spring 72 is substantially the same in all of the contact blade assemblies. A detailed understanding of the construction of the spring 72 may be had from FIGS. 5–7, wherein it will be observed that, in addition to the bent end 74, the spring 72 includes a bead 76 which cooperates with the contact blade end 68 to effect good electrical contact when in operation, and an opening 78 for receiving the shank of a rivet 70. It should be understood that the contact blade assembly 56 is identically constructed to the contact blade assembly 60. It should also be understood that the contact blade assemblies 58 and 62 are constructed in substantially the same manner as the contact blade assembly 60, except for the larger width of their contact blades, because they are the polarized contact blade assemblies. For purposes of convenience, the corresponding parts of the contact blade assemblies 56 and 60 are designated by the same reference numerals, and the corresponding parts of the contact blade assemblies 58 and 62 are designated by the same reference numerals with a prime (′) added.

As can best be seen in FIG. 4, each associated upper contact blade end and bent spring end of the contact blade assemblies that are disposed in compartments 20 are disposed adjacent the inner end of a slot 32. In the case of contact blade assemblies 60 and 62, they are arranged to function as female contact portions for receiving the male contact blades of an electrical plug that is connected to the adapter through the slots 32. It will be understood that the corresponding portions of the contact blade assemblies 56 and 58 are disposed adjacent the inner ends of the slots 30 and function in the same general manner. It will also be understood that the contact blades 66 and 66′ are adapted to be received in female contact portions of an existing, ungrounded, duplex electrical receptacle, as will become apparent subsequently.

A separate, generally U-shaped, female contact clip is disposed and mounted in each of the compartments 22 and 24. These clips are of the same general construction, are designated by reference numerals 80 and 82 and are disposed, respectively, in the compartments 22, 24. The bight portion of each of the clips 80, 82 is secured, as by rivets 84—86, to an elongated grounding plate 88 made of good electrical conducting material. Grounding plate 88 (see FIG. 8) has a major elongated portion 90 which is very roughly complementarily shaped to the shallow recess 40 in the bottom surface of the internal walls of the body 10, and is disposed therein. An end of the grounding plate 82 is curved into a perpendicular terminal wall 92 which is disposed in the cut-out portion 52 of the side wall end 42 and received in an appropriate notch 94 formed in the body 10. An internally threaded collar 96 is formed in the terminal wall 92 and is adapted to threadedly receive a binding screw 98 and function as an electrical terminal in a known manner.

When the grounding plate 88 is fully mounted on the body 10, the female clips 80—82 which it carries are disposed in the compartments 22, 24 and properly mounted therein by projections 100 which are arranged to guide the female clips into their compartments and mount them therein (see FIGS. 3 and 9). When fully mounted, the open upper ends of the female clips 80, 82 are disposed below the lower ends of the openings 34, 36 respectively, in position to receive male grounding contact blades.

The grounding plate 88 has a central opening 102 formed therein which is aligned with the bore 26 in the body 10, when the grounding plate is mounted thereon. The opening 102 and the bore 26 also are aligned with an opening 104 formed in a grounding plate spring 106 (see FIGS. 14 and 15). Passing centrally through the openings 102 and 104 and the bore 26 is an elongated cylindrical eyelet 108. The eyelet 108 has at one of its ends a flange 110 that is disposed in the recess 38 in contact with a shoulder 112 of the body 10, which surrounds the bore 26. The other end 114 of the eyelet is flanged over and thereby retains the grounding plate spring 106 and the grounding plate 88 rigidly in position on the body 10. When so positioned, the grounding plate 88 is disposed in the shallow recess 40, and the generally rectangular, mounting portion 116 of the grounding plate spring 106 is disposed in the generally rectangular portion 46 of the shallow recess between the body 10 and the grounding plate.

The grounding plate spring 106 comprises a bent elongated strip of springy metal and includes a pair of upstanding legs 118 which are bent in a manner which can be most clearly seen in FIG. 15. The opposite corners of the free ends of the legs 118 are formed into sharply pointed tips 120. Prior to being assembled, the generally rectangular portion 116 of the grounding plate spring 106 is bowed in the manner indicated in FIG. 15. During assembling of the grounding plate spring 106 to the body 10, when the eyelet 108 is flanged over at its end 114, the spring is stressed slightly and the bowed spring portion 116 is straightened out. This biases the spring legs 118 toward each other. The spring 106 is made of a good electrical conducting, springy metal, such as hardened spring steel.

The retaining plate 16 is secured to the body 10, as by having self-tapping screws 122 pass through the openings 124 formed in the retaining plate and securely received in the bores 54 in the body 10. The retaining plate 16 also includes appropriate slots 126 for passing over the male contact blade portions 66 and 66' of the contact blade assemblies, an opening 128 which surrounds the rivet 84, and a cut-out 130 which surrounds the rivet 86 and a portion of the bent end of the grounding plate 88. The retaining plate 16 covers the bottom of the body 10 and aids in positioning and maintaining the contact blade assemblies in their compartments. As can best be seen in FIGS. 1 and 3, these assemblies are positioned by shouldered contact between tabs which form a part thereof and appropriate shoulders formed in the compartments, and the retaining plate 16 captures them when it is mounted on the body 10.

A main mounting screw 132 having a kerfed, flat head 134 is loosely disposed in the eyelet 108 so as to have its head disposed in the recess 38 and its lower end 136 project beyond the bottom of the body 10. Between the screw head 134 and the eyelet flange 110 there is disposed a lock washer 138 of the shake-proof type. Intermediate the ends of the eyelet 108 there is formed an inwardly extending, annular rib 140. Most of the shank of screw 132 is plain; however, the end 136 is threaded. The outer diameter of the threaded end 136 is larger than the inner diameter of the rib 140. Therefore, the screw 132 cannot be removed from the body 10.

The precise method of forming and assembling the eyelet and mounting screw into their FIG. 1 configurations and relationship is not critical. The threads on the screw end may be formed after the mounting screw is inserted in the eyelet and the latter is fully mounted in the body 10. If preferred, the threads may be initially formed on the screw end 136 and the mounting screw disposed in the eyelet 108, then the rib 140 may be formed in the eyelet, and then the eyelet and mounting screw may be secured to the body 10. In any event, when finally made, the screw 132 is disposed for rotary and limited axial movement within the eyelet 108, but is not capable of being removed therefrom.

The adapter in use is arranged to be operatively associated with an existing, ungrounding, duplex, electrical receptacle, which is illustrated schematically in FIGS. 1 and 13 and designated by reference character R. In normal building construction, the existing electrical receptacle R is not of the grounding type; however, it is normally secured and mounted on a wall box W which is grounded. The existing receptacle R usually is secured to the wall box W by a yoke Y having ears E that are rigidly secured to tabs T formed on the wall box W. The yoke Y is rigidly secured to the receptacle R, as by a securing member S which usually is a headed, rivet-like member having a central threaded bore B that normally receives a screw for mounting the face plate F to the receptacle R in such a manner that it covers the wall opening O formed in the wall in which the receptacle is mounted. By virtue of this mounting, in the conventional arrangement, the face plate F is usually grounded by the wall box W through the yoke Y, securing member S and usual face plate securing screw, as is known by those skilled in this art.

To convert such an existing, ungrounding duplex, electrical receptacle into a receptacle for receiving a grounding electrical connection, an adapter A contemplated by the instant invention is utilized. With the electrical receptacle R mounted in the normal manner, the face plate F is disposed in position to be mounted thereto. However, the usual face plate securing screw is not utilized. In its place, the threaded end 136 of the mounting screw 132 of the adapter A is utilized, and simultaneously, the male contact blade portions 66 and 66' are inserted into the usual female contact openings in the existing receptacle R to make electrical contact with the usual female contacts therein. The adapter A is securely positioned by tightening its mounting screw 132. The parts are dimensioned so that when mounting the adapter A, the sharply pointed tips 120 of the grounding spring 106 contact the face plate F, the spring legs 118 are deformed and stressed, and the tips 120 dig into the face plate when the mounting screw 132 is turned so as to cause the adapter to be forced against the face plate. The face plate F is made of brass or other electrical conducting material, and as was pointed out above, it is normally grounded by its securing screw. However, in practice, it sometimes is coated with a decorative material, such as paint. The tips 120 pierce such material and make good electrical contact with the face plate F. Tightening of the screw 132 insures the latter, and causes the adapter to be locked in place, because of the locking effect of the lock washer 138. The lock washer 138 is of the shake-proof type which digs into its associated parts to lock them, and therefore, good electrical contact is maintained between the screw head 134 and the eyelet flange 110 by the lock washer 138.

When fully mounted as illustrated in FIGS. 1 and 13, it will be apparent, the grounding plate 88 of the adapter is in good electrical conducting relationship with the face plate F, which in turn is in good electrical conducting relationship with the wall box W which is grounded. The grounding of the grounding plate 88 results, of course, in grounding the female contact clips 80 and 82 and the terminal formed by the binding screw 98 and its associated terminal wall 92, of the grounding plate. This electrical conducting relationship is established by two paths, as follows: The securing member S is in electrical conducting relationship with the yoke Y and the wall box W. One electrical conducting path from the securing member S to the grounding plate 88 is from the securing member through the mounting screw 132, the head 134 thereof, the lock washer 138, the eyelet flange 110, the eyelet 108, the eyelet flange 114 and the grounding plate 88. The other path is through the securing member S, the face plate F, which is likely to be in electrical conducting relationship therewith, the grounding plate spring 106, by virtue of the effective digging of the sharply pointed tips 120 into the face plate F, and the grounding plate 88. If the face plate F is not in electrical conducting relationship with the securing member S, grounding of the face plate is insured by the first described grounding path which grounds the grounding plate 88 and the latter, through the grounding plate spring 106, effectively grounds the face plate.

It will, therefore, be apparent that when the adapter A is secured to the existing receptacle R, grounding electrical connections may be made thereto. For example, a grounding three-wire, three-contact blade plug may be inserted into either end of the adapter in the conventional manner so as to have its grounding contact blade received in either of the grounding, female contact clips 80 or 82. If it is desired to make a grounded electrical connection with a conventional two-wire, two-contact blade plug and a separate grounding wire, the separate grounding wire may be electrically connected to the terminal formed by the binding screw 98 and the terminal wall 92 of the grounding plate 88. In either event, the adapter A permits a grounded electrical connection to be made to an existing, ungrounding, electrical receptacle.

Another important alternative use for the screw-type terminal formed by binding screw 98 and terminal wall 92 to the one just described, viz., to receive a grounding wire from a device to be grounded, is to function as a means for grounding the adapter, whenever a grounding path cannot be established through the receptacle, the face plate or the face plate security screw, receiving member S, as occurs in some installations of ungrounding receptacles where their wall boxes are not grounded, and therefore, grounding cannot be effected through the receptacle. In this event, a grounding wire may be attached to the screw-type terminal formed by binding screw 98 and terminal wall 92 and to a source of ground other than the receptacle, such as a water pipe, and thereby insure that the adapter is grounded.

In view of the foregoing, it will be apparent generally that each and every one of the objects of this invention has been satisfied, and particularly that an adapter has been provided which has automatic grounding means, wherein the act of mounting the adapter on the existing ungrounding receptacle automatically results in grounding the adapter. Further, it should be apparent that the particular means of effecting such grounding is positive, highly effective and reliable, there being alternate grounding paths. Furthermore, in conformity with the sound safety practices, the mounting screw of the adapter, which is an essential element of the grounding system therefor, cannot be removed from the adapter.

As will be evident from the foregoing description, certain aspects of my invention are not limited to the particular details of construction of the example illustrated, and I contemplate that various and other modifications and applications will occur to those skilled in the art. It is, therefore my intention that the appended claims shall cover such modifications and applications as do not depart from the true spirit and scope of my invention.

What I claim as new and desire to secure by Letters Patent of the United States is:

1. An adapter for an ungrounding electrical receptacle for rendering the receptacle usable with a grounding electrical connection which includes a grounding element comprising: a body of electrical insulation material; a pair of contact blade assemblies supported by said body; each of said assemblies comprising a female contact portion that is arranged to receive a male contact blade of the grounding electrical connection and a male contact portion which is arranged to be inserted into a female contact of the receptacle; and grounding means arranged to connect the grounding element of said grounding electrical connection to a source of ground including a securing screw for mounting the adapter on the receptable that is arranged to be received in the usual grounded face plate securing screw receiving means of the receptacle for normally grounding itself and the remainder of said grounding means, a grounding contact that is arranged in said body to receive the grounding element if it is in the form of a grounding contact, and a screw-type terminal including a flat binding plate portion and a binding screw adjustably mounted therein for receiving the grounding element if it is in the form of a grinding wire, said screw-type terminal also being adapted to be directly connected to an alternate source of ground other than the face plate securing screw receiving means by a separate conductor wire, said mounting screw, said grounding contact and said screw-type terminal all being separate elements and spaced from but electrically connected to each other, whereby either said mounting screw or said screw-type terminal may be utilized to connect said grounding means to a source of ground, and either said grounding contact or said screw-type terminal may be utilized to receive the grounding element of said grounding electrical connection.

2. An adapter as defined in claim 1 wherein said adapter grounding means includes a U-shaped grounding spring comprising a bent elongated strip of metal that is supported by said body and electrically connected to said securing screw, said grounding contact and said screw-type terminal, the legs of said spring being disposed to project from said body and having sharply pointed tips arranged to be biased into contact with and dig into a receptacle face plate to ground the latter if it is electrically conductive when the adapter is operatively mounted on a receptacle having such a face plate.

3. An adapter as defined in claim 1 wherein said adapter mounting screw is irremovably mounted on said body.

4. An adapter as defined in claim 3 wherein said mounting screw is disposed in and extends through an eyelet that is secured to said body and has an enlarged head adjacent one end of said eyelet; said eyelet has an inwardly extending annular rib formed therein intermediate its ends; said mounting screw has a substantial plane shank portion extending through said eyelet and having a smaller external diameter than the internal diameter of said rib; and the external diameters of the threaded end and said head of the mounting screw are larger than said internal diameter whereby said mounting screw is irremovably mounted in said body.

5. An adapter as defined in claim 1 wherein said adapter grounding means also includes a grounding plate that supports and electrically connects said grounding contact and said screw-type terminal; and said mounting screw is disposed in a metallic eyelet that rigidly secures said grounding plate to said body.

6. An adapter as defined in claim 5 wherein said screw-type terminal is formed on a bent end of said grounding plate and accessible from a side of said body; and said mounting screw extends through said body and is accessible from the front thereof.

References Cited in the file of this patent

UNITED STATES PATENTS

| | | |
|---|---|---|
| 1,179,728 | Knapp | Apr. 18, 1916 |
| 1,268,457 | Haynes et al. | June 4, 1918 |
| 1,857,398 | Phillips | May 10, 1932 |
| 1,878,779 | Jung et al. | Sept. 20, 1932 |
| 2,067,796 | Smith | Jan. 12, 1937 |
| 2,484,558 | Eisner | Oct. 11, 1949 |
| 2,743,423 | Parks | Apr. 24, 1956 |
| 2,749,434 | Falge | June 5, 1956 |
| 2,779,998 | Bailey | Feb. 5, 1957 |
| 2,792,557 | Dowick | May 14, 1957 |
| 2,872,503 | Winter | Feb. 3, 1959 |
| 2,911,608 | Lee | Nov. 3, 1959 |
| 2,966,651 | Von Holtz | Dec. 27, 1960 |
| 2,970,287 | Gill | Jan. 31, 1961 |
| 2,986,718 | Bender | May 30, 1961 |

FOREIGN PATENTS

| | | |
|---|---|---|
| 949,669 | Germany | Sept. 27, 1956 |

OTHER REFERENCES

Electrical World (Publication), May 15, 1955, page 177. (Copy in Patent Office Division 20.)